US012166522B2

(12) United States Patent
Chen

(10) Patent No.: US 12,166,522 B2
(45) Date of Patent: *Dec. 10, 2024

(54) RF SYSTEM AND ELECTRONIC DEVICE

(71) Applicant: GUANGDONG OPPO MOBILE TELECOMMUNICATIONS CORP., LTD., Guangdong (CN)

(72) Inventor: Xianlong Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 344 days.

This patent is subject to a terminal disclaimer.

(21) Appl. No.: 17/691,509

(22) Filed: Mar. 10, 2022

(65) Prior Publication Data
US 2022/0200651 A1 Jun. 23, 2022

Related U.S. Application Data

(63) Continuation of application No. 17/187,305, filed on Feb. 26, 2021, now Pat. No. 11,303,318.

(30) Foreign Application Priority Data

Mar. 3, 2020 (CN) .......................... 202010139803.0

(51) Int. Cl.
*H04B 1/401* (2015.01)
*H04B 7/06* (2006.01)
(52) U.S. Cl.
CPC ............. *H04B 1/401* (2013.01); *H04B 7/06* (2013.01)
(58) Field of Classification Search
CPC .......... H04B 1/401; H04B 7/06; H04B 1/406; H04B 1/0064; H04B 1/40
USPC ............................................. 375/219
See application file for complete search history.

(56) References Cited

U.S. PATENT DOCUMENTS 11,303,318 B2 * 4/2022 Chen ................. H04B 1/406

FOREIGN PATENT DOCUMENTS

CN 108880600 A 11/2018
CN 109861734 A 6/2019

OTHER PUBLICATIONS

CNIPA, Notice of Allowance for CN 202111043617.8, Jun. 10, 2022.
CNIPA, First Office Action for CN 202111043617.8, Apr. 1, 2022.

* cited by examiner

*Primary Examiner* — Tanmay K Shah
(74) *Attorney, Agent, or Firm* — Hodgson Russ LLP

(57) ABSTRACT

A radio frequency (RF) system is provided. The RF system includes an RF transceiver, an RF processing circuit, a transfer switch module, a first antenna, a second antenna, a third antenna, and a fourth antenna. The RF transceiver is coupled with the RF processing circuit. The RF processing circuit is coupled with the transfer switch module. The transfer switch module is coupled with the first antenna, the second antenna, the third antenna, and the fourth antenna. When the RF system operates in a non-standalone (NSA) mode, the first antenna is configured for transmission in a first low band (LB) and primary reception in the first LB, the second antenna is configured for transmission in a second LB and primary reception in the second LB, the third antenna is configured for diversity reception in the second LB, and the fourth antenna is configured for diversity reception in the first LB.

20 Claims, 5 Drawing Sheets

RF SYSTEM AND ELECTRONIC DEVICE

CROSS-REFERENCE TO RELATED APPLICATIONS

The present application is a continuation of U.S. patent application Ser. No. 17/187,305, filed Feb. 26, 2021, which claims priority to Chinese Patent Application No. 202010139803.0, filed Mar. 3, 2020, the disclosures of which are hereby incorporated by reference in their entireties.

TECHNICAL FIELD

This disclosure relates to the technical field of radio frequency (RF), and more particularly, to an RF system and an electronic device.

BACKGROUND

With the widespread use of electronic devices such as smart phones, the smart phone can support an increasing number of applications and is becoming more and more powerful. The smart phone is developing in a diversified and personalized way, becoming an indispensable electronic product in users' life. Electronic devices in the fourth-generation (4G) mobile communication system generally adopt a single-antenna or dual-antenna RF system architecture. The RF architecture of 4G scheme is relatively simple, including transmit (Tx) devices, receive (Rx) devices, transfer switches, and antennas. The Tx device may include a low-band (LB) Tx module and a middle-high-band (MHB) Tx module. The Rx device may include a primary receive (PRx) module and a diversity receive (DRx) module.

SUMMARY

In view of above, an RF system and an electronic device are provided.

In a first aspect, an RF system is provided according to implementations of the present disclosure. The RF system includes an RF transceiver, an RF processing circuit, a transfer switch module, a first antenna, a second antenna, a third antenna, and a fourth antenna. The RF transceiver is coupled with the RF processing circuit. The RF processing circuit is coupled with the transfer switch module. The transfer switch module is coupled with the first antenna, the second antenna, the third antenna, and the fourth antenna. When the RF system operates in a non-standalone (NSA) mode, the first antenna is configured for transmission in a first low band (LB) and primary reception in the first LB, the second antenna is configured for transmission in a second LB and primary reception in the second LB, the third antenna is configured for diversity reception in the second LB, and the fourth antenna is configured for diversity reception in the first LB.

In a second aspect, an electronic device is provided according to implementations of the present disclosure. The electronic device includes the RF system of the first aspect. When the RF system operates in the NSA mode, the RF system is configured to implement transmission and reception in the first LB, the first MB, and the first HB, and to implement transmission and reception in the second LB, the second MB, and the second HB.

According to the implementations, four antennas are adopted to support LB+LB NSA and dual MHB NSA, to greatly improve versatility of NSA on the electronic device.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
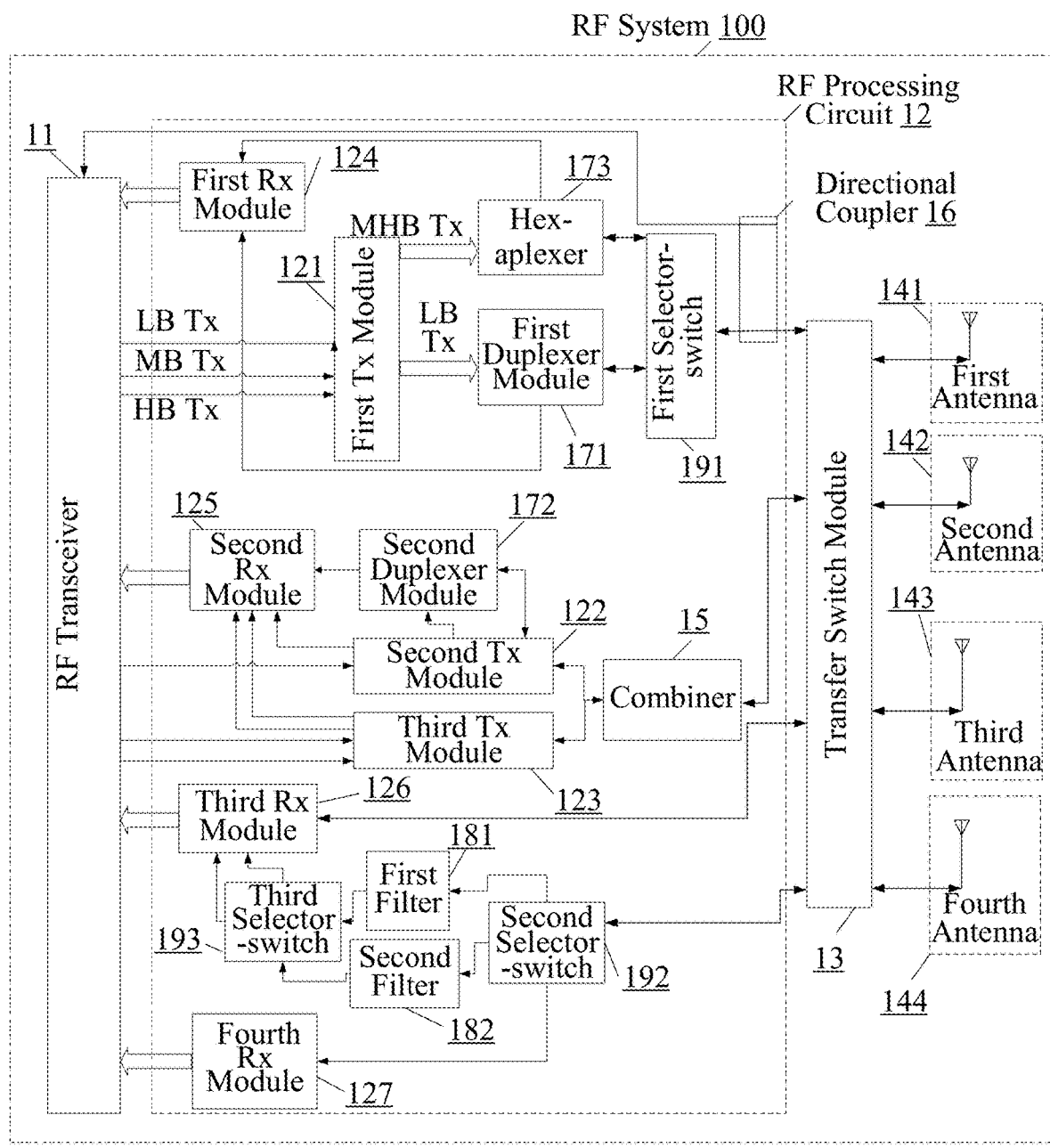
FIG. 1 is a schematic structural diagram illustrating an RF system according to implementations.

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms such as "first" and "second" used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, system, product, or apparatus including a series of steps or units is not limited to the listed steps or units, it can optionally include other operations or units that are not listed; alternatively, other operations or units inherent to the process, product, or device can be included either.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

An electronic device involved in the implementations of the present disclosure may include various handheld devices, in-vehicle devices, wearable devices, computing devices that have wireless communication functions or other processing devices connected to the wireless modem, as well as various forms of user equipment (UE) (such as mobile phones), mobile stations (MS), terminal devices, and the like. For the convenience of description, the above-mentioned devices are collectively referred to as an electronic device.

In implementations of the present disclosure, an NSA mode includes any one of EN-DC, NE-DC, and NG EN-DC architectures.

Under the EN-DC architecture, the electronic device is connected to the 4G core network, the 4G base station is the primary station, and the fifth-generation (5G) base station is the secondary station.

Under the NE-DC architecture, the 5G core network is introduced, the 5G base station is the primary station, and the 4G base station is the secondary station.

Under the NG EN-DC architecture, the 5G core network is introduced, the 4G base stations is the primary station, and the 5G base stations is the secondary station.

"DC" stands for dual connectivity; "E" stands for evolved universal mobile telecommunications system (UMTS) terrestrial radio access (evolved-UMTS terrestrial radio access, E-UTRA, or EUTRA), that is, the 4G wireless access network; "N" stands for new radio (NR), that is, the 5G NR; "NG" stands for next generation core network, that is, the 5G core network.

"EN-DC" refers to dual connection of 4G wireless access network and 5G NR. "NE-DC" refers to dual connection of 5G NR and 4G wireless access network. "NG EN-DC" refers to dual connection of 4G wireless access network and 5G NR under the 5G core network.

For the convenience of explanation, the following illustrates a case where the NSA mode includes the EN-DC architecture.

Under the EN-DC architecture, the RF system in the implementation supports LB+LB NSA. "LB+LB NSA" means that LB LTE (long term evolution) and LB NR work together, which requires two power amplifiers (PA) to operate simultaneously for signal transmission. Furthermore, LB LTE and LB NR both require two antennas, where one antenna is used for transmit (Tx) or primary receive (PRx) and the other antenna is used for diversity receive (DRx). Therefore, to realize LB+LB NSA, four antennas are required. The LB antenna is large in size, in contrast, for small-sized electronic devices (for example, mobile phones), the clearance area reserved for the LB antenna is small, which may be not big enough to accommodate four LB antennas. Therefore, it is difficult to arrange four LB antennas with good antenna efficiency in the small-sized electronic device. In order to ensure reliability of uplink signals, two antennas with better antenna efficiency among the four antennas can be used for transmission of LB LTE signals and LB NR signals.

The RF system in implementations of the present disclosure further supports MHB+MHB NSA. "MHB+MHB NSA" means that MHB LTE and MEM NR work together, which requires two MHB PAs. Furthermore, LTE requires two antennas, and NR requires four antennas.

Therefore, to realize MHB+MHB NSA, six antennas are required. With existing devices supporting carrier aggregation (CA) function, four MHB antennas are adopted. Therefore, only four antennas are required to support LB+LB EN-DC and MHB+MHB EN-DC simultaneously.

FIG. 1 is a schematic structural diagram illustrating an RF system 100 according to implementations. The RF system 100 includes an RF transceiver 11, an RF processing circuit 12 coupled with the RF transceiver 11, a transfer switch module 13, a first antenna 141, a second antenna 142, a third antenna 143, and a fourth antenna 144.

The RF processing circuit 12 includes a first Tx module 121, a second Tx module 122, a third Tx module 123, a combiner 15, a directional coupler 16, a first Rx module 124, a second Rx module 125, a third Rx module 126, a fourth Rx module 127, a hexaplexer 173, a first duplexer module 171, a second duplexer module 172, a first filter 181, a second filter 182, a first selector-switch 191, a second selector-switch 192, and a third selector-switch 193.

The first Tx module 121 has a LB output port coupled with the transfer switch module 13 through the first duplexer module 171, the first selector-switch 191, and the directional coupler 16. The first Tx module 121 has an MB output port and an HB output port each coupled with the transfer switch module 13 through the hexaplexer 173, the first selector-switch 191, and the directional coupler 16. The second Tx module 122 is coupled with the transfer switch module 13 through the second duplexer module 172 and the combiner 15. The third Tx module 123 is coupled with the transfer switch module 13 through the combiner 15. The first Rx module 124 is coupled with the transfer switch module 13 through the first duplexer module 171, the hexaplexer 173, the first selector-switch 191, and the directional coupler 16. The second Rx module 125 is coupled with the transfer switch module 13 through the second Tx module 122, the third Tx module 123, the second duplexer module 172, and the combiner 15. The third Rx module 126 is directly coupled with the transfer switch module 13, and is coupled with the transfer switch module 13 through the third selector-switch 193, the first filter 181, the second filter 182, and the second selector-switch 192. The fourth Rx module 127 is coupled with the transfer switch module 13 through the second selector-switch 192. The transfer switch module 13 is coupled with the first antenna 141, the second antenna 142, the third antenna 143, and the fourth antenna 144. Antenna efficiency of the first antenna 141 and the second antenna 142 is higher than that of the third antenna 143 and the fourth antenna 144.

When the RF system 100 operates in an NSA mode, the first antenna 141 is used for transmission in a first LB, a first MB, and a first HB and primary reception in the first LB, the first MB, and the first HB, the second antenna 142 is used for transmission in a second LB, a second MB, and a second HB and primary reception in the second LB, the second MB, and the second HB, the third antenna 143 is used for diversity reception in the second LB, the second MB, and the second HB, and the fourth antenna 144 is used for diversity reception in the first LB, the first MB, and the first HB.

In an implementation, when the RF system 100 operates in an LTE mode, the antennas function as follows. The first antenna 141 is used for transmission in the first LB, the first MB, and the first HB and primary reception in the first LB, the first MB, and the first HB. The second antenna 142 is used for diversity reception in the first LB, the first MB, and the first HB. The third antenna 143 and the fourth antenna 144 stop operating. Alternatively, the third antenna 143 and the fourth antenna 144 are used for reception in the first LB to realize MIMO function. As such, channel capacity can be greatly improved.

In an implementation, the first LB may include a first sub-band (for example, Band 8 (B8), a second sub-band (for example, Band 20 (B20)), and a third sub-band (for example, Band 28A (B28A)). The first MB may include a fourth sub-band (for example, Band 1) and a fifth sub-band (for example, Band 3). The first HB may include Band 7. The first LB, the second LB, and the first HB in implementations of the present disclosure are LTE bands and can be re-farmed to NR bands as Bands N1, N3, N7, N8, N20, N28A, etc. The LTE bands and the NR bands, though named differently, have the same frequency range, which will not be repeated herein.

The connection mode of the RF system 100 will be described below.

The RF transceiver 11 has a first LB Tx port, a first MB Tx port, and a first HB Tx port each coupled with a corresponding input port of the first Tx module 121. The first Tx module 121 has an LB output port coupled with a Tx input port of the first duplexer module 171. The first duplexer module 171 has a bi-directional port coupled with the first selector-switch 191. The first duplexer module 171 has an Rx output port coupled with an LB input port of the first Rx module 124. The first Tx module 121 has an MB output port coupled with an MB input port of the hexaplexer 173. The first Tx module 121 has an HB output port coupled with an HB input port of the hexaplexer 173. The hexaplexer 173 has a bi-directional port coupled with the first selector-switch 191. The hexaplexer 173 has an Rx output port coupled with an MHB input port of the first Rx module 124. The first Rx module 124 has an output port coupled with a first Rx port of the RF transceiver 11. The first selector-switch 191 is coupled with the transfer switch module 13 through the directional coupler 16. The RF transceiver 11 has a second LB Tx port coupled with an input port of the second Tx module 122. The second Tx module 122 has an output port coupled with an input port of the second duplexer module 172. The second Tx module 122 has a first bi-directional port coupled with a bi-directional port of the second duplexer module 172. The second Tx module 122 has a second bi-directional port coupled with a first port of the combiner 15. The second Tx module 122 has an Rx output port coupled with an LB Rx port of the second Rx module 125. The second duplexer module 172 has an Rx output port of is coupled with a PRx port of the second Rx module 125. The RF transceiver 11 has a second MB Tx port and a second HB Tx port each coupled with a corresponding input port of the third Tx module 123. The third Tx module 123 has a bi-directional port coupled with a second port of the combiner 15. The third Tx module 123 has an MB Rx output port coupled with an MB Rx port of the second Rx module 125, the third Tx module 123 has an MB Rx output port coupled with an HB Rx port of the second Rx module 125. The second Rx module 125 has an output port coupled with a second Rx port of the RF transceiver 11. The combiner 15 has a third port coupled with the transfer switch module 13. The RF transceiver 11 has a third Rx port coupled with an output port of the third Rx module 126. The third Rx module 126 has a second DRx port coupled with the transfer switch module 13. The third Rx module 126 has a first DRx port coupled with the third selector-switch 193. The third selector-switch 193 is coupled with a first port of the first filter 181 and a first port of the second filter 182. The first filter 181 has a second port coupled with the second selector-switch 192. The second filter 182 has a second port coupled with the second selector-switch 192. The second selector-switch 192 is coupled with an Rx input port of the fourth Rx module 127 and the transfer switch module 13. The fourth Rx module 127 has an output port coupled with a fourth Rx port of the RF transceiver 11.

The RF path in each of the first LB (for example, LB LTE band) and the first MHB band (for example, MHB LTE band) circulates Tx signals, PRx signals, and DRx signals. The RF path in each of the second LB (for example, LB NR band) and the second MHB band (for example, MHB NR band) circulates Tx signals, PRx signals, DRx signals, multiple-input multiple-output PRx (MIMO PRx) signals, and MIMO DRx signals.

An exemplary signal flow in the RF system 100 is described below.

The operating path under LB LTE+MHB NR EN-DC is as follows.

LTE: the first Tx module 121 (Tx)+the first duplexer module 171 (PRx)+the first filter 181 and the second filter 182 (DRx);

NR: the third Tx module 123 (Tx/PRx)+the third Rx module 126 (DRx)+the first Tx module 121 (MIMO PRx)+ the fourth Rx module 127 (MIMO DRx).

The operating path under MHB LTE+LB NR EN-DC is as follows.

LTE: the first Tx module 121 (Tx)+the hexaplexer 173 (PRx)+the first filter 181 and the second filter 182 (DRx);

NR: the second Tx module 122 (Tx/PRx)+the third Rx module 126 (DRx).

The operating path under LB LTE+LB NR EN-DC is as follows.

LTE: the first Tx module 121 (Tx)+the first duplexer module 171 (PRx)+the first filter 181 and the second filter 182 (DRx);

NR: the second Tx module 122 (Tx/PRx)+the third Rx module 126 (DRx).

The operating path under MHB LTE+MEM NR EN-DC is as follows.

LTE: the first Tx module 121 (Tx)+the hexaplexer 173 (PRx)+the fourth Rx module 127 (MIMO DRx);

NR: the third Tx module 123 (Tx/PRx)+the third Rx module 126 (DRx)+the hexaplexer 173 (MIMO PRx)+the fourth Rx module 127 (MIMO DRx).

In an implementation, in the LTE network mode, the 4G signal can be routed through the second Tx module 122/the third Tx module 123, alternatively, the 4G signal can be transmitted through the first Tx module 121+the first duplexer module 171. In the NR network mode, the 5G signal can be routed through the second Tx module 122/the third Tx module 123, alternatively, the 5G signal can be routed through the first Tx module 121+the first duplexer module 171.

Figure 2:
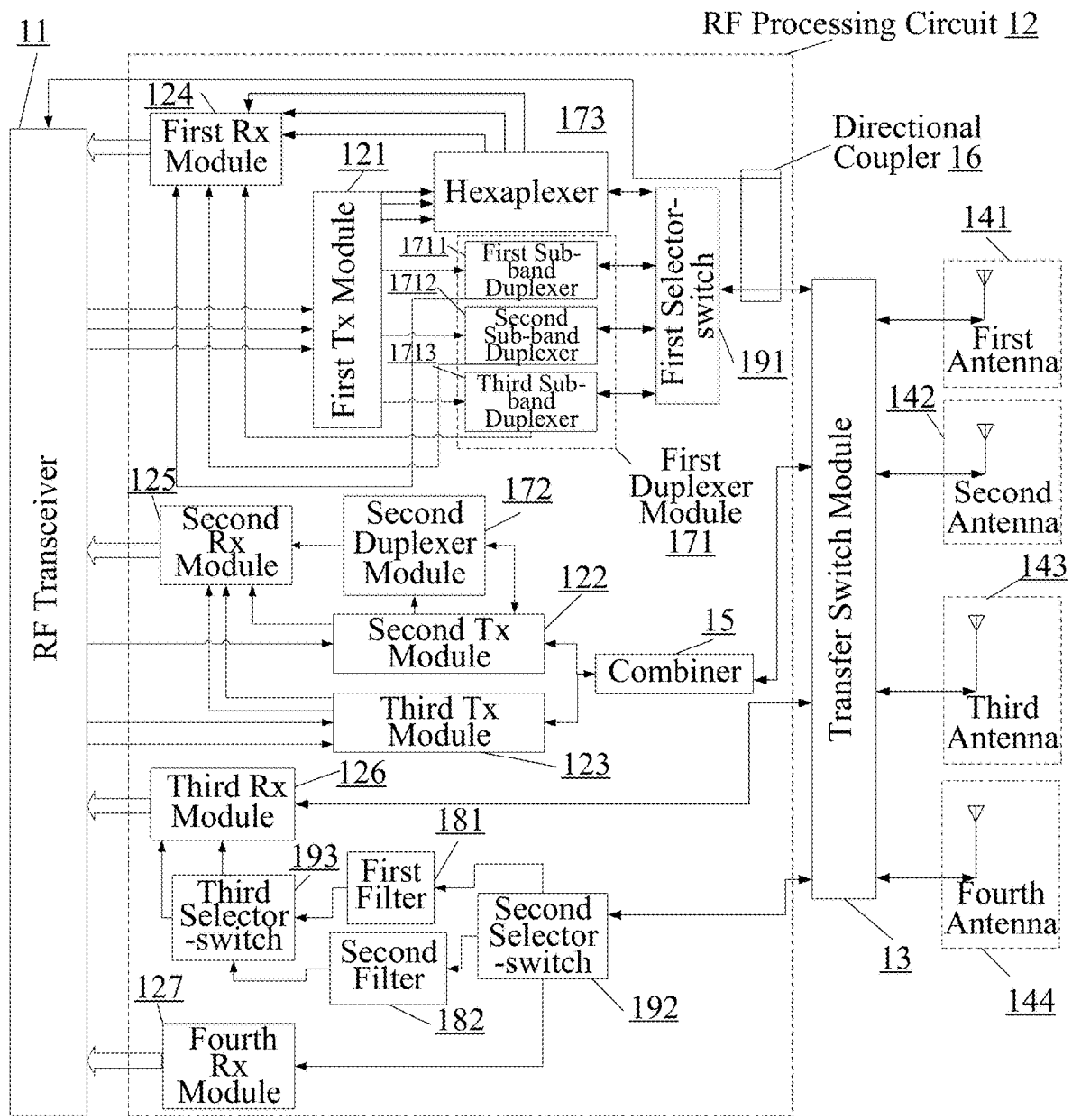
FIG. 2 is a schematic structural diagram illustrating an RF system according to other implementations.

FIG. 2 is a schematic structural diagram illustrating the RF system 100 according to other implementations.

The first duplexer module 171 may include a first sub-band duplexer 1711 (for example, B8), a second sub-band duplexer 1712 (for example, B20), and a third sub-band duplexer 1713 (for example, B28A). The LB output port of the first Tx module 121 includes a first sub-band output port, a second sub-band output port, and a third sub-band output port. The LB input port of the first Rx module 124 includes a first sub-band input port, a second sub-band input port, and a third sub-band input port.

The MB input port of the hexaplexer 173 includes a fourth sub-band MB input port and a fifth sub-band MB input port. The Rx output port of the hexaplexer 173 includes a first HB Rx output port, a fourth sub-band Rx output port, and a fifth sub-band Rx output port. The MB output port of the first Tx module 121 includes a fourth sub-band output port and a fifth sub-band output port. The MHB input port of the first Rx module 124 includes a first HB input port, a fourth sub-band input port, and a fifth sub-band input port.

The first sub-band output port of the first Tx module 121 is coupled with a first port of the first sub-band duplexer 1711. The second sub-band output port of the first Tx module 121 is coupled with a first port of the second sub-band duplexer 1712. The third sub-band output port of the first Tx module 121 is coupled with a first port of the third sub-band duplexer 1713. The first sub-band duplexer 1711 has a second port coupled with the first selector-switch 191. The second sub-band duplexer 1712 has a second port coupled with the first selector-switch 191. The third sub-band duplexer 1713 has a second port coupled with the first selector-switch 191. The first sub-band duplexer 1711 has a third port coupled with the first sub-band input port of the first Rx module 124. The second sub-band duplexer 1712 has a third port coupled with the second sub-band input port of the first Rx module 124. The third sub-band duplexer 1713 has a third port coupled with the third sub-band input port of the first Rx module 124.

The fourth sub-band output port of the first Tx module 121 is coupled with the fourth sub-band MB input port of the hexaplexer 173. The fifth sub-band output port of the first Tx module 121 is coupled with the fifth sub-band MB input port of the hexaplexer 173. The first HB Rx output port of the hexaplexer 173 is coupled with the first HB input port of the first Rx module 124. The fourth sub-band Rx output port of the hexaplexer 173 is coupled with the fourth sub-band input port of first Rx module 124. The fifth sub-band Rx output port of the hexaplexer 173 is coupled with the fifth sub-band input port of first Rx module 124. The other connections in FIG. 2 are the same as those in FIG. 1, and will not be repeated herein.

The first duplexer module 171 may include a B8 duplexer, a B20 duplexer, or a B28A duplexer. Under LB LTE+MHB NR, the LB can route through the first Tx module 121. At this time, the second Tx module 122 and the third Tx module 123 can share a power integrated circuit (IC) for power supply, thereby eliminating the need to provide an additional power IC for simultaneous operating of the second Tx module 122 and the third Tx module 123.

In implementations of the present disclosure, the first Tx module 121 may include a multi-mode multi-band PA (MMPA), where a PA, a switch, and the like can be integrated into the MMPA.

In at least one example, the second Tx module 122 may include an LB PA with antenna switch module and filter and duplexer (PAMID), where the LB PAMID is an RF integrated module that integrates a PA, a duplexer, a filter, and a switch.

In at least one example, the third Tx module 123 may include an MHB PA with antenna switch module and filter and duplexer (PAMID), where the MHB PAMID is an RF integrated module that integrates a PA, a duplexer, a filter, and a switch.

In at least one example, the first Rx module 124 and the second Rx module 125 may include a micro low noise amplifier (MLNA), where the MLNA can integrate a low noise amplifier (LNA) to amplify Rx signals.

In at least one example, the third Rx module 126 may include an L-DRx (LTE-discontinuous receive), where the L-DRx is an Rx module that integrates a surface acoustic wave (SAW) filter and an LNA to filter and amplify Rx signals.

In at least one example, the fourth Rx module 127 includes an LNA.

In at least one example, the transfer switch module 13 includes a quad-pole quad-throw (4P4T) switch, or a triple-pole triple-throw (3P3T) switch, or the like. The first selector-switch 191 includes a single-pole quad-throw (SP4T) switch. The second selector-switch 192 includes a single-pole triple-throw (SP3T) switch. The third selector-switch 193 includes a dual-pole dual-throw (DPDT) switch.

Figure 3A:
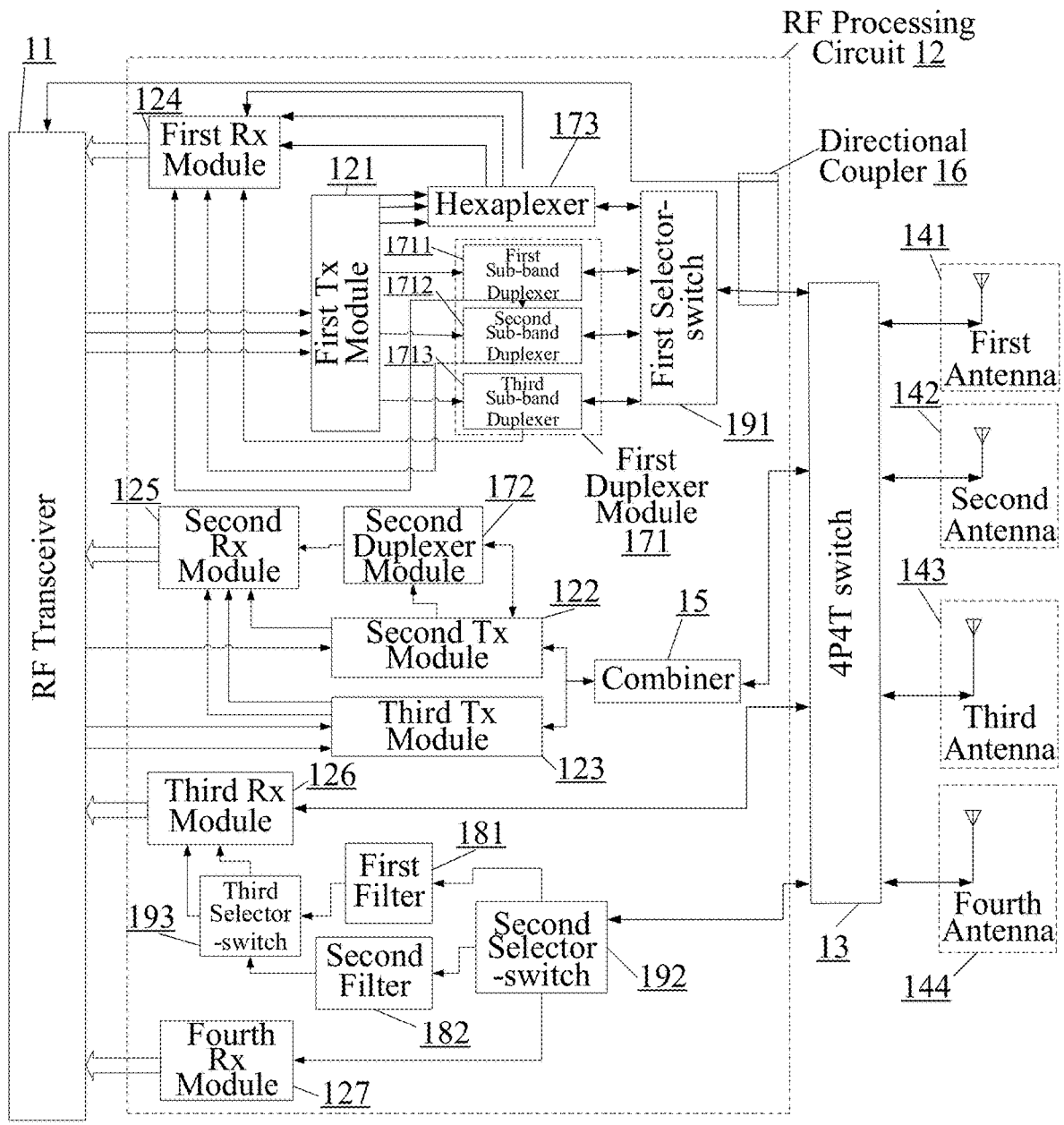
FIG. 3a is a schematic structural diagram illustrating an RF system where a transfer switch module of the RF system is a 4P4T switch according to implementations.

In at least one example, 4P4T switch is taken as an example of the transfer switch module 13 for description. FIG. 3a is a schematic structural diagram illustrating an RF system where a transfer switch module of the RF system is a 4P4T switch according to implementations. A P port of the first selector-switch 191 is coupled with a first T port of the 4P4T switch 13 through the directional coupler 16. The third port of the combiner 15 is coupled with a second T port of the 4P4T switch 13. The second DRx port of the third Rx module 126 is coupled with a third T port of the 4P4T switch 13. The second selector-switch 192 is coupled with a fourth T port of the 4P4T switch 13. The 4P4T switch 13 has: a first P port coupled with the first antenna 141, a second P port coupled with the second antenna 142, a third P port coupled with the third antenna 143, and a fourth P port coupled with the fourth antenna 144. The remaining connection parts in FIG. 3a are the same as those in the above RF system, which will not be repeated herein.

Figure 3B:
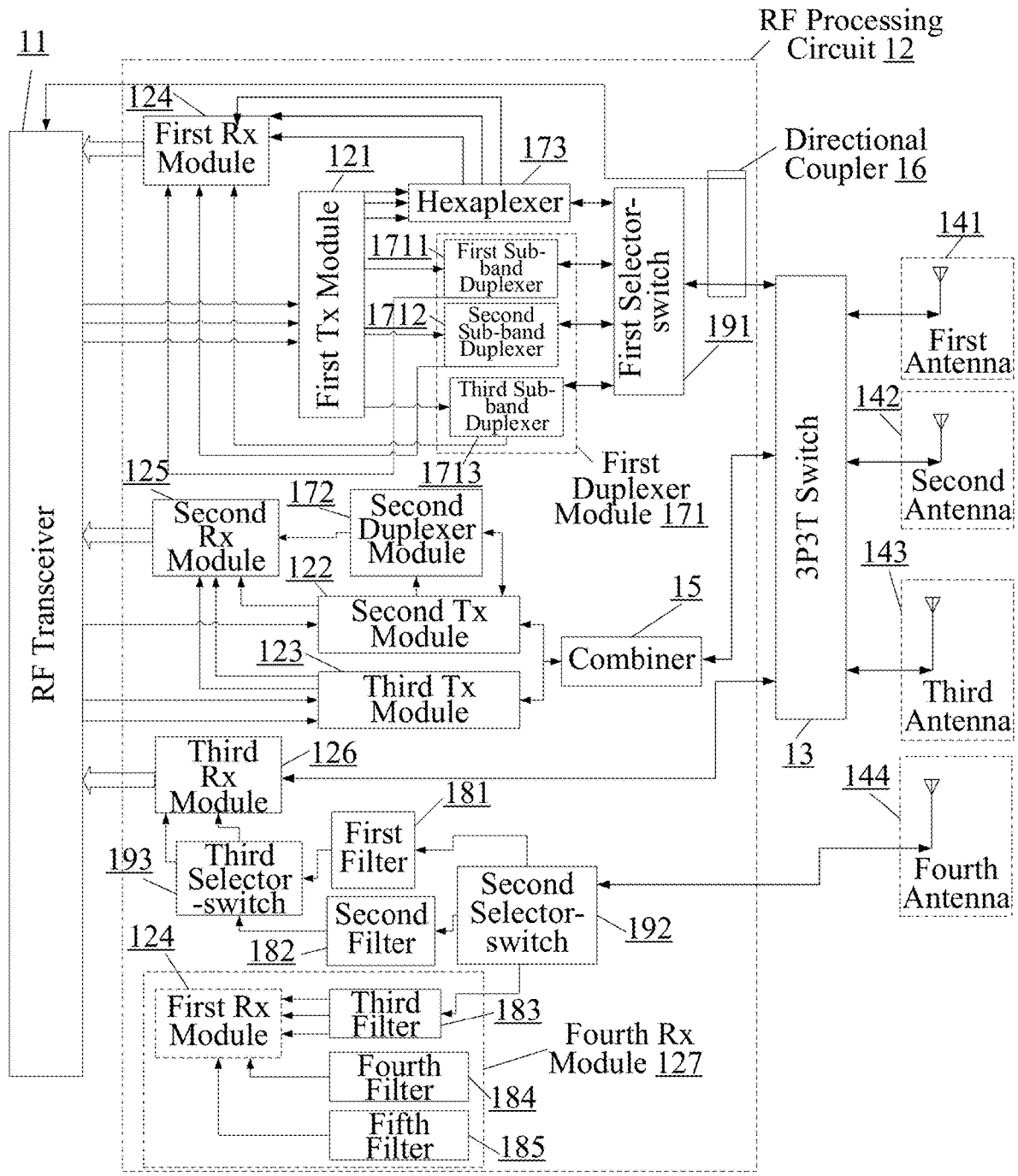
FIG. 3b is a schematic structural diagram illustrating an RF system where a transfer switch module of the RF system is a 3P3T switch according to implementations.

In at least one example, 3P3T switch is taken as an example of the transfer switch module 13 for description. FIG. 3b is a schematic structural diagram illustrating an RF system where a transfer switch module of the RF system is a 3P3T switch according to implementations. A P port of the first selector-switch 191 is coupled with a first T port of the 3P3T switch 13 through the directional coupler 16. The third port of the combiner 15 is coupled with a second T port of the 3P3T switch 13. The second DRx port of the third Rx module 126 is coupled with a third T port of the 3P3T switch 13. The 3P3T switch 13 has: a first P port coupled with the first antenna 141, a second P port coupled with the second antenna 142, and a third P port coupled with the third antenna 143; the second selector-switch is coupled with the fourth antenna 144. In this implementation, the fourth Rx module 127 may include an MLNA, a third filter 183, a fourth filter 184, and a fifth filter 185. In an example, the fourth Rx module 127 can be omitted, that is, the fourth Rx module 127 can be replaced with the first Rx module 124, the third filter 183, the fourth filter 184, and the fifth filter 185. In an example, the third filter 183 may be a B1+B3+B41 SAW, the fourth filter 184 may be a B7 SAW, and the fifth filter 185 may be a B40 SAW. The remaining connection parts in FIG. 3b are the same as those in the above RF system, which will not be repeated herein.

Figure 4:
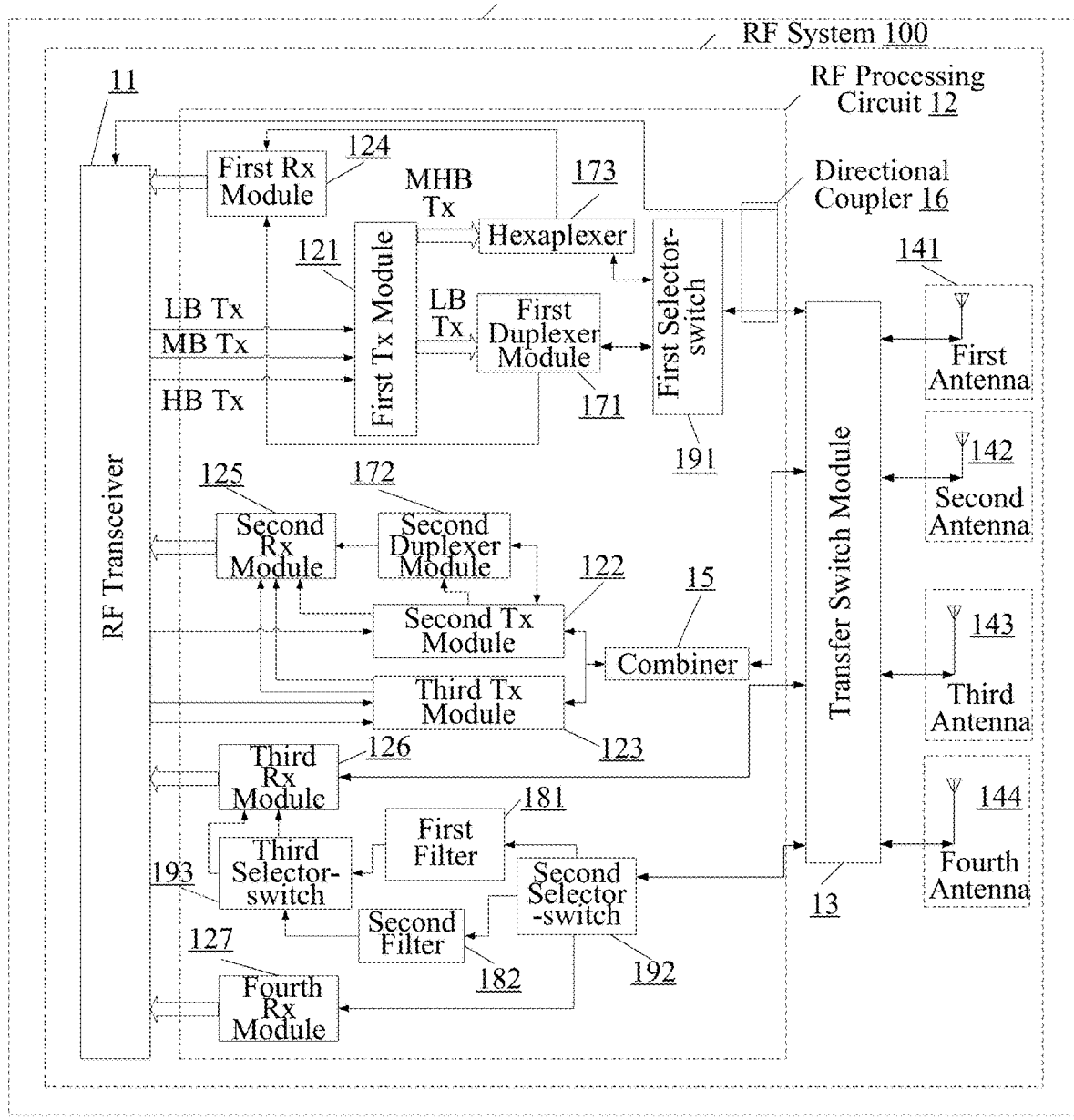
FIG. 4 is a schematic structural diagram illustrating an electronic device according to implementations.

FIG. 4 is a schematic structural diagram illustrating an electronic device 10 according to implementations. The electronic device 10 may include the RF system 100. When the RF system 100 operates in the NSA mode, the RF system 100 is configured to implement transmission and reception in the first LB, the first MB, and the first HB, and to implement transmission and reception in the second LB, the second MB, and the second HB.

Although the implementations of the disclosure have been illustrated and described above, it is appreciated that a person of ordinary skill in the art can make various improvements and modifications to the above implementations without departing from the principles of implementations of the disclosure, and these improvements and modifications also fall within the protection scope of the disclosure.

What is claimed is:

1. A radio frequency (RF) system, comprising an RF transceiver, an RF processing circuit, a transfer switch module, a first antenna, a second antenna, a third antenna, and a fourth antenna, wherein:

the RF transceiver is coupled with the RF processing circuit, the RF processing circuit is coupled with the transfer switch module, the transfer switch module is coupled with the first antenna, the second antenna, the third antenna, and the fourth antenna; and when the RF system operates in a non-standalone (NSA) mode, the first antenna is configured for transmission in a first low band (LB) and primary reception in the first LB, the second antenna is configured for transmission in a second LB and primary reception in the second LB, the third antenna is configured for diversity reception in the second LB, and the fourth antenna is configured for diversity reception in the first LB.

2. The RF system of claim 1, wherein when the RF system operates in a long term evolution (LTE) mode,
the first antenna is configured for transmission in the first LB and primary reception in the first LB;
the second antenna is configured for diversity reception in the first LB; and
the third antenna and the fourth antenna stop operating, or the third antenna and the fourth antenna are configured for reception in the first LB to realize a multiple-input multiple-output (MIMO) function.

3. The RF system of claim 1, wherein when the RF system operates in the NSA mode, the first antenna is used for transmission in a first middle band (MB) and a first high band (HB) and primary reception in the first MB and the first HB, the second antenna is used for transmission in a second MB and a second HB and primary reception in the second MB and the second HB, the third antenna is used for diversity reception in the second MB and the second HB, and the fourth antenna is used for diversity reception in the first MB and the first HB.

4. The RF system of claim 1, wherein when the RF system operates in an LTE mode, the first antenna is used for transmission in a first MB and a first HB and primary reception in the first MB and the first HB, the second antenna is used for diversity reception in the first MB and the first HB, and the third antenna and the fourth antenna stop operating.

5. The RF system of claim 1, wherein the RF processing circuit comprises:
a first transmit (Tx) module, a first duplexer module, a first selector-switch, a directional coupler, and a first receive (Rx) module, wherein the first Tx module has an LB output port coupled with the transfer switch module through the first duplexer module, the first selector-switch, and the directional coupler, and the first Rx module is coupled with the transfer switch module through the first duplexer module, the first selector-switch, and the directional coupler;
a second Tx module, a second duplexer module, a combiner, and a second Rx module, wherein the second Tx module is coupled with the transfer switch module through the second duplexer module and the combiner, and the second Rx module is coupled with the transfer switch module through the second Tx module, the second duplexer module, and the combiner; and
a third Rx module, a third selector-switch, a first filter, a second filter, a second selector-switch, and a fourth Rx module, wherein the third Rx module is directly coupled with the transfer switch module and is coupled with the transfer switch module through the third selector-switch, the first filter, the second filter, and the second selector-switch, and the fourth Rx module is coupled with the transfer switch module through the second selector-switch.

6. The RF system of claim 5, wherein:
the RF transceiver has a first LB Tx port coupled with an input port of the first Tx module, the LB output port of the first Tx module is coupled with an Tx input port of the first duplexer module, the first duplexer module has a bi-directional port coupled with the first selector-switch, the first duplexer module has an Rx output port coupled with an LB input port of the first Rx module, the first Rx module has an output port coupled with a first Rx port of the RF transceiver, and the first selector-switch is coupled with the transfer switch module through the directional coupler;
the RF transceiver has a second LB Tx port coupled with an input port of the second Tx module, the second Tx module has: an output port coupled with an input port of the second duplexer module, a first bi-directional port coupled with a bi-directional port of the second duplexer module, a second bi-directional port coupled with a first port of the combiner, and an Rx output port coupled with an LB Rx port of the second Rx module;
the second duplexer module has an Rx output port coupled with a primary receive (PRx) port of the second Rx module, the second Rx module has an output port coupled with a second Rx port of the RF transceiver, and the combiner has a third port coupled with the transfer switch module;
the RF transceiver has a third Rx port coupled with an output port of the third Rx module, the third Rx module has: a second diversity receive (DRx) port coupled with the transfer switch module, and a first DRx port coupled with the third selector-switch; and
the third selector-switch is coupled with a first port of the first filter and a first port of the second filter, the first filter has a second port coupled with the second selector-switch, the second filter has a second port coupled with the second selector-switch, the second selector-switch is coupled with an Rx input port of the fourth Rx module and the transfer switch module, and the fourth Rx module has an output port coupled with a fourth Rx port of the RF transceiver.

7. The RF system of claim 3, wherein the RF processing circuit comprises:
a first Tx module, a hexaplexer, a first selector-switch, a directional coupler, and a first Rx module, wherein the first Tx module has an MB output port and an HB output port each coupled with the transfer switch module through the hexaplexer, the first selector-switch, and the directional coupler, and the first Rx module is coupled with the transfer switch module through the hexaplexer, the first selector-switch, and the directional coupler;
a third Tx module, a combiner, and a second Rx module, wherein the third Tx module is coupled with the transfer switch module through the combiner, the second Rx module is coupled with the transfer switch module through the third Tx module and the combiner; and
a third Rx module, a third selector-switch, a first filter, a second filter, a second selector-switch, and a fourth Rx module, wherein the third Rx module is directly coupled with the transfer switch module, and is coupled with the transfer switch module through the third selector-switch, the first filter, the second filter, and the second selector-switch, and the fourth Rx module is coupled with the transfer switch module through the second selector-switch.

8. The RF system of claim 7, wherein:
the RF transceiver has a first MB Tx port and a first HB Tx port each coupled with a corresponding input port of the first Tx module, the first Tx module has an MB output port coupled with an MB input port of the hexaplexer, the first Tx module has an HB output port coupled with an HB input port of the hexaplexer, the hexaplexer has a bi-directional port coupled with the first selector-switch, the hexaplexer has an Rx output port coupled with an MHB input port of the first Rx module, the first Rx module has an output port coupled with a first Rx port of the RF transceiver, the first selector-switch is coupled with the transfer switch module through the directional coupler;

the RF transceiver has a second MB Tx port and a second HB Tx port each coupled with a corresponding input port of the third Tx module, the third Tx module has a bi-directional port coupled with a second port of the combiner, the third Tx module has an MB Rx output port coupled with an MB Rx port of the second Rx module, the third Tx module has an HB Rx output port coupled with an HB Rx port of the second Rx module, the second Rx module has an output port coupled with a second Rx port of the RF transceiver, and the combiner has a third port coupled with the transfer switch module; and the RF transceiver has a third Rx port coupled with an output port of the third Rx module, the third Rx module has a second DRx port coupled with the transfer switch module, the third Rx module has a first DRx port coupled with the third selector-switch, the third selector-switch is coupled with a first port of the first filter and a first port of the second filter, the first filter has a second port coupled with the second selector-switch, the second filter has a second port coupled with the second selector-switch, the second selector-switch is coupled with an Rx input port of the fourth Rx module and the transfer switch module, the fourth Rx module has an output port coupled with a fourth Rx port of the RF transceiver.

9. The RF system of claim 5, wherein the first LB comprises a first sub-band, a second sub-band, and a third sub-band.

10. The RF system of claim 7, wherein the first MB comprises a fourth sub-band and a fifth sub-band.

11. An electronic device comprising a radio frequency (RF) system, wherein:
the RF system comprises an RF transceiver, an RF processing circuit, a transfer switch module, a first antenna, a second antenna, a third antenna, and a fourth antenna, wherein:
  the RF transceiver is coupled with the RF processing circuit, the RF processing circuit is coupled with the transfer switch module, the transfer switch module is coupled with the first antenna, the second antenna, the third antenna, and the fourth antenna; and
  when the RF system operates in a non-standalone (NSA) mode, the first antenna is configured for transmission in a first low band (LB) and primary reception in the first LB, the second antenna is configured for transmission in a second LB and primary reception in the second LB, the third antenna is configured for diversity reception in the second LB, and the fourth antenna is configured for diversity reception in the first LB; and
  when the RF system operates in the NSA mode, the RF system is configured to implement transmission and reception in the first LB, and to implement transmission and reception in the second LB.

12. The electronic device of claim 11, wherein when the RF system operates in a long term evolution (LTE) mode,
the first antenna is configured for transmission in the first LB and primary reception in the first LB;
the second antenna is configured for diversity reception in the first LB; and
the third antenna and the fourth antenna stop operating, or the third antenna and the fourth antenna are configured for reception in the first LB to realize a multiple-input multiple-output (MIMO) function.

13. The electronic device of claim 11, wherein when the RF system operates in the NSA mode, the first antenna is used for transmission in a first middle band (MB) and a first high band (HB) and primary reception in the first MB and the first HB, the second antenna is used for transmission in a second MB and a second HB and primary reception in the second MB and the second HB, the third antenna is used for diversity reception in the second MB and the second HB, and the fourth antenna is used for diversity reception in the first MB and the first HB.

14. The electronic device of claim 11, wherein when the RF system operates in an LTE mode, the first antenna is used for transmission in a first MB and a first HB and primary reception in the first MB and the first HB, the second antenna is used for diversity reception in the first MB and the first HB, and the third antenna and the fourth antenna stop operating.

15. The electronic device of claim 11, wherein the RF processing circuit comprises:
  a first transmit (Tx) module, a first duplexer module, a first selector-switch, a directional coupler, and a first receive (Rx) module, wherein the first Tx module has an LB output port coupled with the transfer switch module through the first duplexer module, the first selector-switch, and the directional coupler, and the first Rx module is coupled with the transfer switch module through the first duplexer module, the first selector-switch, and the directional coupler;
  a second Tx module, a second duplexer module, a combiner, and a second Rx module, wherein the second Tx module is coupled with the transfer switch module through the second duplexer module and the combiner, and the second Rx module is coupled with the transfer switch module through the second Tx module, the second duplexer module, and the combiner; and
  a third Rx module, a third selector-switch, a first filter, a second filter, a second selector-switch, and a fourth Rx module, wherein the third Rx module is directly coupled with the transfer switch module and is coupled with the transfer switch module through the third selector-switch, the first filter, the second filter, and the second selector-switch, and the fourth Rx module is coupled with the transfer switch module through the second selector-switch.

16. The electronic device of claim 15, wherein:
the RF transceiver has a first LB Tx port coupled with an input port of the first Tx module, the LB output port of the first Tx module is coupled with an Tx input port of the first duplexer module, the first duplexer module has a bi-directional port coupled with the first selector-switch, the first duplexer module has an Rx output port coupled with an LB input port of the first Rx module, the first Rx module has an output port coupled with a first Rx port of the RF transceiver, and the first selector-switch is coupled with the transfer switch module through the directional coupler;
the RF transceiver has a second LB Tx port coupled with an input port of the second Tx module, the second Tx module has: an output port coupled with an input port of the second duplexer module, a first bi-directional port coupled with a bi-directional port of the second duplexer module, a second bi-directional port coupled with a first port of the combiner, and an Rx output port coupled with an LB Rx port of the second Rx module;

the second duplexer module has an Rx output port coupled with a primary receive (PRx) port of the second Rx module, the second Rx module has an output port coupled with a second Rx port of the RF transceiver, and the combiner has a third port coupled with the transfer switch module;

the RF transceiver has a third Rx port coupled with an output port of the third Rx module, the third Rx module has: a second diversity receive (DRx) port coupled with the transfer switch module, and a first DRx port coupled with the third selector-switch; and the third selector-switch is coupled with a first port of the first filter and a first port of the second filter, the first filter has a second port coupled with the second selector-switch, the second filter has a second port coupled with the second selector-switch, the second selector-switch is coupled with an Rx input port of the fourth Rx module and the transfer switch module, and the fourth Rx module has an output port coupled with a fourth Rx port of the RF transceiver.

17. The electronic device of claim 13, wherein the RF processing circuit comprises:

a first Tx module, a hexaplexer, a first selector-switch, a directional coupler, and a first Rx module, wherein the first Tx module has an MB output port and an HB output port each coupled with the transfer switch module through the hexaplexer, the first selector-switch, and the directional coupler, and the first Rx module is coupled with the transfer switch module through the hexaplexer, the first selector-switch, and the directional coupler;

a third Tx module, a combiner, and a second Rx module, wherein the third Tx module is coupled with the transfer switch module through the combiner, the second Rx module is coupled with the transfer switch module through the third Tx module and the combiner; and a third Rx module, a third selector-switch, a first filter, a second filter, a second selector-switch, and a fourth Rx module, wherein the third Rx module is directly coupled with the transfer switch module, and is coupled with the transfer switch module through the third selector-switch, the first filter, the second filter, and the second selector-switch, and the fourth Rx module is coupled with the transfer switch module through the second selector-switch.

18. The electronic device of claim 17, wherein:

the RF transceiver has a first MB Tx port and a first HB Tx port each coupled with a corresponding input port of the first Tx module, the first Tx module has an MB output port coupled with an MB input port of the hexaplexer, the first Tx module has an HB output port coupled with an HB input port of the hexaplexer, the hexaplexer has a bi-directional port coupled with the first selector-switch, the hexaplexer has an Rx output port coupled with an MHB input port of the first Rx module, the first Rx module has an output port coupled with a first Rx port of the RF transceiver, the first selector-switch is coupled with the transfer switch module through the directional coupler;

the RF transceiver has a second MB Tx port and a second HB Tx port each coupled with a corresponding input port of the third Tx module, the third Tx module has a bi-directional port coupled with a second port of the combiner, the third Tx module has an MB Rx output port coupled with an MB Rx port of the second Rx module, the third Tx module has an HB Rx output port coupled with an HB Rx port of the second Rx module, the second Rx module has an output port coupled with a second Rx port of the RF transceiver, and the combiner has a third port coupled with the transfer switch module; and the RF transceiver has a third Rx port coupled with an output port of the third Rx module, the third Rx module has a second DRx port coupled with the transfer switch module, the third Rx module has a first DRx port coupled with the third selector-switch, the third selector-switch is coupled with a first port of the first filter and a first port of the second filter, the first filter has a second port coupled with the second selector-switch, the second filter has a second port coupled with the second selector-switch, the second selector-switch is coupled with an Rx input port of the fourth Rx module and the transfer switch module, the fourth Rx module has an output port coupled with a fourth Rx port of the RF transceiver.

19. The electronic device of claim 15, wherein the first LB comprises a first sub-band, a second sub-band, and a third sub-band.

20. The electronic device of claim 17, wherein the first MB comprises a fourth sub-band and a fifth sub-band.

* * * * *